United States Patent Office.

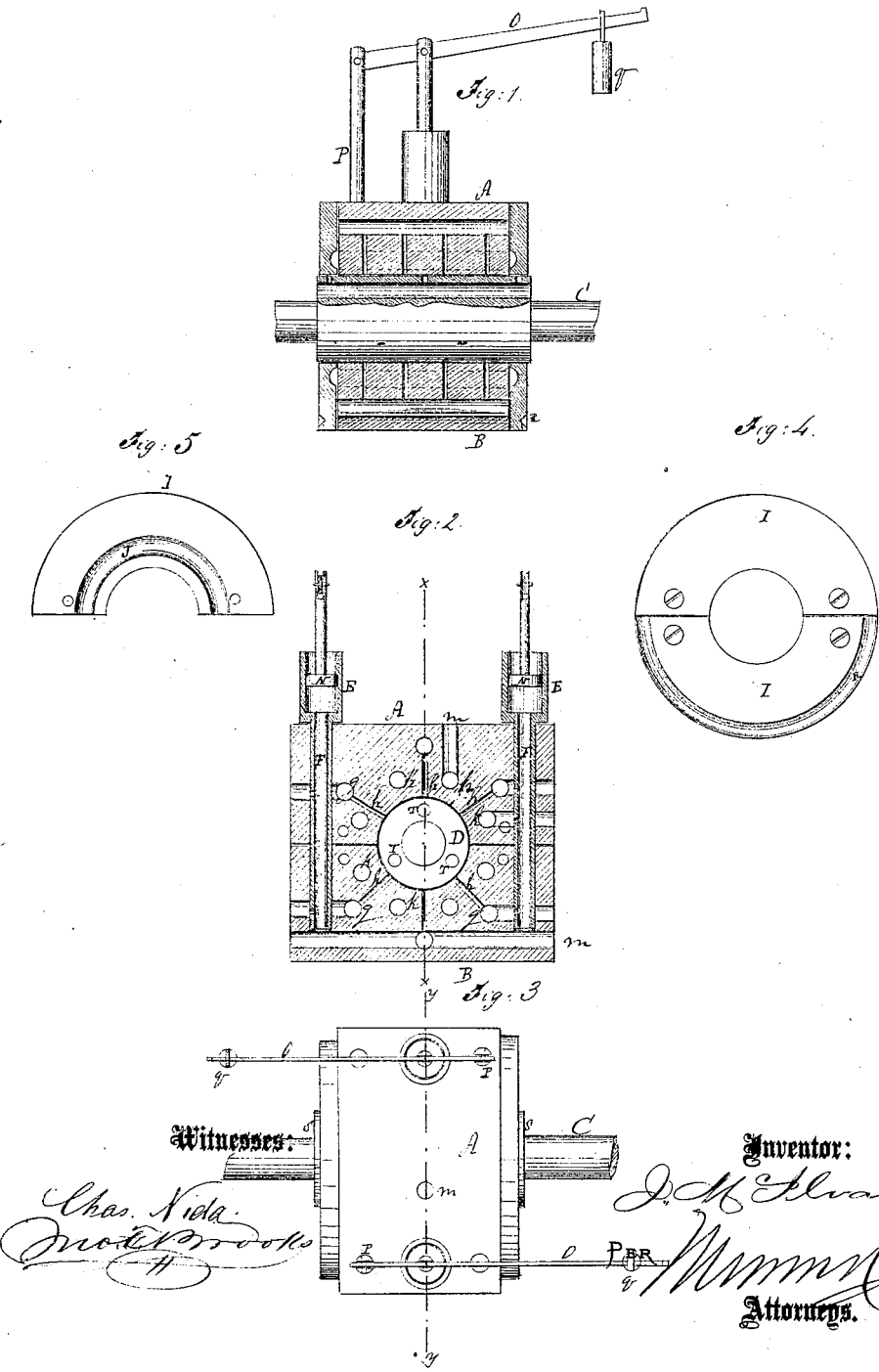

JEREMIAH McILVAIN, OF CHURCHVILLE, MARYLAND.

Letters Patent No. 98,987, dated January 18, 1870.

IMPROVEMENT IN JOURNAL-BOXES.

The Schedule referred to in these Letters Patent and making part of the same.

*To all whom it may concern:*

Be it known that I, JEREMIAH McILVAIN, of Churchville, in the county of Harford, and State of Maryland, have invented a new and useful Improvement in Journal-Boxes and Journals; and I do hereby declare that the following is a full, clear, and exact description thereof, which will enable others skilled in the art to make and use the same, reference being had to the accompanying drawings, forming part of this specification.

This invention relates to new and useful improvements in boxes for shaft-journals, and in the journals themselves, whereby journals are kept properly lubricated and cool; and The invention consists in arranging a series of holes connected with reservoirs, with pistons for lubricating, and other holes for the introduction of water or air for cooling or ventilating the box and journal, as will be hereinafter more fully described.

In the accompanying drawings—

Figure 1 represents a vertical section of fig. 2, through the line $x\ x$.

Figure 2 is a vertical section of fig. 3, through the line $y\ y$.

Figure 3 is a top or plan view.

Figure 4 is an end view, showing the semicircles around the shaft-journal.

Figure 5 represents an inside view of one of the semicircles, detached.

Similar letters of reference indicate corresponding parts.

A B represent the box, which is formed of two parts or half boxes, as is usual.

C represents the shaft.

D is the journal.

E E represent reservoirs on the top portion of the box, for the oil or other lubricating-material.

F T are tubes connected with the reservoirs, which extend down to near the bottom of the box, as seen in the drawings. These tubes connect with a series of holes, (more or less in number,) which convey the oil or other lubricating-matter to all portions of the journal. The tubes F F are adjustable, and may be turned around, so that holes through them will register with the different holes which convey the lubricating-material to the journal. There are index-points on the top of the box and on the sides of the reservoirs, which serve as guides to indicate the position of the oil-apertures, to enable the attendant to throw oil to any desired part of the journal.

$g$ represents holes, more or less in number, which run through the box, parallel with the journal. These are connected with the tubes F F, and with the journal, by a series of small holes, $h$, as seen in the drawing.

I represents semicircular plates, which cover the ends of the box, and fit the journal, so as to make the interior water-tight.

On the inside of these plates there are grooves J, by which a communication is maintained with another series of holes, $k$, which also run parallel with the journal.

There are apertures, $m$, through the sides and top and bottom of the box, through which water or air, for cooling the box and journal, may be introduced, by which means a circulation may be constantly kept up.

N represents pistons or flanges in the reservoir E, which are connected with levers O O. The fulcra of these levers are on studs P P. The long ends of the levers are weighted, as seen at $q\ q$, so that the lubricating-material is forced through the aperture and to any part of the journal, as before stated. More or less pressure may be given, by adjusting the weights on the levers.

On the outside of the lower semicircular plate I, grooves are formed, as seen at R, for receiving any oil that may escape to the outside from the journal.

It will be noticed that the journal D is of greater diameter than the shaft, and that there are shoulders formed, as seen at S S, at each end.

Through the journal, longitudinally, from one shoulder S to the other, holes are bored, (more or less in number,) which may or may not connect, by small apertures, with the wearing surface of the journal, but through which there may be a circulation of air or water maintained, (forced or otherwise,) for preventing the heating of the journal.

T represents such holes, in this example of my invention.

In case of a forced circulation of air or water, a stationary chamber, surrounding the shaft at one end of the journal, may be provided. There may be a forced circulation of water or air through the water-apertures in the box, as already described, while there is, at all times, a forced discharge of oil or other lubricating-material on to the journal, and to any portion of the journal, as before stated.

With the above-described arrangement, journals of steamboat-shafts, as well as journals of other shafting, may be perfectly secured and protected from failure or injury from imperfect lubrication, and from heating.

Having thus described my invention,

I claim as new, and desire to secure by Letters Patent—

In combination with a journal-box, the system of holes $g\ h$, tubes F, reservoir E, and pistons N, constructed and arranged as described, whereby the oil or other lubricating-material may be forced to the journal, in the manner substantially as set forth.

Witnesses:      JEREMIAH McILVAIN.
RICHD. LOPLIN,
GEORGE W. McILVAIN.